United States Patent Office 2,726,206
Patented Dec. 6, 1955

2,726,206
SOLUTION OF ACETYLENE IN DIETHYL PHOSPHITE

Quirino A. Trementozzi, Dayton, Ohio, assignor to Monsanto Chemical Company, St. Louis, Mo., a corporation of Delaware No Drawing. Application October 24, 1952, Serial No. 316,793

2 Claims. (Cl. 252—1)

This invention relates to acetylene and more specifically to acetylene solutions. This invention also relates to the recovery of acetylene from an acetylene containing gas by means of a selective solvent.

It is known in the art that various organic compounds have shown utility as selective solvents for acetylene, thereby affording means for storing acetylene in the form of solutions of acetylene in these solvents and means of extracting acetylene from gas mixtures or increasing the acetylene content of such gas mixtures.

It is an object of this invention to provide a class of solvents having exceptional utility in the aforementioned applications. Other objects will become apparent from the description of this invention.

It has been discovered that the dialkyl phosphites having the formula:

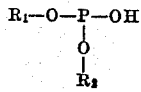

wherein $R_1$ and $R_2$ represent alkyl radicals which may be the same or different from each other, containing from 1 to 4 carbon atoms, are excellent solvents for acetylene. The Bunsen coefficients (volume of gas, measured at 0° C. and 760 mm. Hg, dissolved, at the temperature of the experiment, in one volume of solvent at a gas partial pressure of 760 mm. Hg) for acetylene in these solvents indicate their excellent solvent action for acetylene. The Bunsen coefficient for acetylene at 25° C. in diethyl phosphite is approximately 20, while the Bunsen coefficient for acetylene at 25° C. in dipropyl phosphite is approximately 15. Correspondingly high Bunsen coefficients for acetylene are to be found in dimethyl phosphite, diisopropyl phosphite, diisobutyl phosphite, ethylmethyl phosphite, and dibutyl phosphite.

The unexpected outstanding utility of these phosphites as acetylene solvents is made clearly evident by comparing the solubility of acetylene in these dialkyl phosphites with the solubility of acetylene in trialkyl phosphites. The Bunsen coefficient for acetylene at 25° C. in triethyl phosphite is approximately 10. It has been found that the hydroxyl group generally results in decreased acetylene solvency. It would be expected, therefore, that the dialkyl phosphites would be poorer solvents for acetylene than the trialkyl phosphites. Just the opposite has been found to be true.

According to this invention, dialkyl phosphites are most efficiently used in the extraction of acetylene from diluted acetylene such as is obtained by the partial oxidation of low molecular weight hydrocarbons. As an example, dilute acetylene obtained from the partial oxidation of methane with oxygen has the following composition:

| | Percent |
|---|---|
| $C_2H_2$ | 8.5 |
| $H_2$ | 51.4 |
| N | 1.6 |
| CO | 26.3 |
| $CH_4$ | 5.8 |
| $CO_2$ | 5.9 |
| $C_2H_4$ | 0.1 |
| Heavier acetylenes | 0.4 |

This gas stream is treated under pressure with the aforementioned solvents in any convenient manner well known to those skilled in the art as, for example, by countercurrent absorption in a suitable column. The solution of acetylene is then transferred to a suitable column. The solution of acetylene is then transferred to a suitable desorption column where the pressure is released and the temperature raised. Concentrated acetylene is thus obtained and any contamination of the acetylene with the solvent is so small as to be insignificant.

In addition to the utility of these solvents in the extraction of acetylene from diluted acetylene, the Bunsen coefficients of these dialkyl phosphites clearly indicate that they are particularly suited for storing acetylene under elevated pressures.

The dialkyl phosphites may be used per se as acetylene solvents or they may be used in mixtures with other acetylene solvents.

What is claimed is:

1. A composition of matter comprising a solution of acetylene in diethyl phosphite.

2. In a process for the recovery of acetylene from an acetylene containing gas, the step of treating said gas with diethyl phosphite.

References Cited in the file of this patent

UNITED STATES PATENTS 2,580,622    Vogt et al. _____ Jan. 1, 1952